(12) United States Patent
Bushman (10) Patent No.: US 10,474,537 B2
(45) Date of Patent: *Nov. 12, 2019

(54) UTILIZING AN INCREMENTAL BACKUP IN A DECREMENTAL BACKUP SYSTEM

(71) Applicant: STORAGECRAFT TECHNOLOGY CORPORATION, Draper, UT (US)

(72) Inventor: Nathan S. Bushman, Pleasant Grove, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/048,687

(22) Filed: Feb. 19, 2016

(65) Prior Publication Data

US 2016/0170839 A1 Jun. 16, 2016

Related U.S. Application Data

(63) Continuation of application No. 14/501,766, filed on Sep. 30, 2014, now Pat. No. 9,367,401.

(51) Int. Cl.
*G06F 11/14* (2006.01)
*G06F 16/27* (2019.01)

(52) U.S. Cl.
CPC ...... *G06F 11/1461* (2013.01); *G06F 11/1446* (2013.01); *G06F 11/1448* (2013.01); *G06F 16/27* (2019.01); *G06F 11/1451* (2013.01)

(58) Field of Classification Search
CPC ......... G06F 17/30091; G06F 17/30575; G06F 11/1446; G06F 11/1461; G06F 11/1451;

(Continued)

(56) References Cited

U.S. PATENT DOCUMENTS 7,694,088 B1 * 4/2010 Bromley ............. G06F 11/1458
711/162
8,364,648 B1 1/2013 Sim-Tang
(Continued)

OTHER PUBLICATIONS

United States Patent and Trademark Office, Office Action, dated Feb. 24, 2015, 17 pages, in U.S. Appl. No. 14/501,766.

(Continued)

*Primary Examiner* — James Trujillo
*Assistant Examiner* — Fatima P Mina
(74) *Attorney, Agent, or Firm* — Maschoff Brennan (57) ABSTRACT

Utilizing an incremental backup in a decremental backup system. In one example embodiment, a method for utilizing an incremental backup in a decremental backup system includes creating a base backup that includes all original allocated blocks in a source storage at a first point in time. Next, an incremental backup is created that includes allocated blocks in the source storage that were newly allocated or were changed between the first point in time and a second point in time. The changed allocated blocks in the incremental backup are identified. During a third time period, a decremental backup is created and the incremental backup is ingested into the base backup by copying, into the decremental backup, original allocated blocks from the base backup that correspond to the changed allocated blocks in the incremental backup. Lastly, the newly-allocated blocks and the changed allocated blocks from the incremental backup are added to the base backup.

12 Claims, 6 Drawing Sheets

(58) Field of Classification Search
CPC .. G06F 2201/84; G06F 11/1469; G06F 16/27;
G06F 11/1448; G06F 11/1458
USPC ........................................................ 707/646
See application file for complete search history.

(56) References Cited

U.S. PATENT DOCUMENTS

| | | |
|---|---|---|
| 2006/0059384 A1 | 3/2006 | Helliker |
| 2011/0196840 A1 | 8/2011 | Barzilai et al. |
| 2014/0136485 A1* | 5/2014 | Miyoshi ................ G06F 3/0617 |
| | | 707/654 |

OTHER PUBLICATIONS

United States Patent and Trademark Office, Final Office Action, dated Sep. 30, 2014, 20 pages, in U.S. Appl. No. 14/501,766
United States Patent and Trademark Office, Notice of Allowance, dated Feb. 17, 2016, 14 pages, in U.S. Appl. No. 14/501,766.

* cited by examiner

UTILIZING AN INCREMENTAL BACKUP IN A DECREMENTAL BACKUP SYSTEM

CROSS-REFERENCE TO A RELATED APPLICATION

This application is a continuation of U.S. patent application Ser. No. 14/501,766, filed Sep. 30, 2014, and titled "UTILIZING AN INCREMENTAL BACKUP IN A DECREMENTAL BACKUP SYSTEM," which is incorporated herein by reference in its entirety.

FIELD

The embodiments disclosed herein relate to utilizing an incremental backup in a decremental backup system.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and free blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since free blocks are not generally backed up.

Image backup can be relatively fast compared to file backup because reliance on the file system is minimized. An image backup can also be relatively fast compared to a file backup because seeking during image backup may be reduced. In particular, during image backup, blocks are generally read sequentially with relatively limited seeking. In contrast, during file backup, blocks that make up individual files may be scattered in the source storage, resulting in relatively extensive seeking.

Although image backup may be fast compared to file backup, creation of a base backup of source storage can take hours and possibly days to complete, depending on the size of the source storage. Further, repeatedly backing up an entire source storage may be unnecessary where most of the allocated blocks in the source storage do not frequently change.

One alternative to creating multiple base backups is to employ an incremental backup system. Incremental backup systems generally create a base backup of a source storage and then create multiple incremental backups of the source storage. An incremental backup generally includes only allocated blocks that were modified since the last backup of the source storage. The source storage can later be restored by applying the backups to a restore storage. Specifically, the base backup is first applied to the restore storage and then each successive incremental backup is applied to the restore storage. Although creating incremental backups can be relatively fast, restoring successive incremental backups can be relatively slow compared to a restoration in other image backup systems.

One image backup system that is capable of relatively fast restoration is a decremental backup system, also known as reverse incremental backup system. Decremental backup systems initially create a base backup to capture the state of a source storage at an initial point in time, then update the base backup to capture the state of the source storage at a subsequent point in time by modifying only those blocks in the base backup that were modified between the initial and subsequent points in time. Prior to the updating of the base backup, however, any original blocks in the base backup that correspond to the modified blocks are copied to a decremental backup, thus enabling restoration of the source storage at the initial point in time (by restoring the updated base backup and then restoring the decremental backup) or at the subsequent point in time (by simply restoring the updated base backup). Since restoring a single base backup is generally faster than restoring a base backup and one or more incremental backups, employing a decremental backup system instead of an incremental backup system may enable the most recent backup to be restored more quickly since the most recent backup is always a base backup instead of potentially being an incremental backup.

One common problem that is encountered with decremental backup systems, however, is that the creation of a decremental backup generally takes longer than the creation of an incremental backup. Therefore, the relatively slow restoration time associated with incremental backup systems and the relatively slow backup time associated with decremental backup systems makes neither type of system an ideal choice for the backing up and restoration of a source storage.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to utilizing an incremental backup in a decremental backup system. The example methods disclosed herein create an incremental backup in a decremental backup system and then later ingest the incremental backup into a base backup, resulting in the creation of an additional decremental backup. As a result, these example methods employ a hybrid backup system that takes advantage of the best aspects of incremental backup systems and decremental backup systems. In some embodiments, the timing of creating incremental backups versus creating decremental backups is dictated by a policy. For example, the policy may dictate that incremental backups be created during work hours, while resource utilization is relatively higher, and that decremental backups only be created after work hours, when resource utilization is relatively lower. Further, the policy may further dictate that the incremental backups be ingested into the base backup, resulting in the creation of additional decremental backups, after work hours when resource utilization is relatively lower. Since the creation of incremental backups is generally less resource intensive than the creation of decremental backups and than the ingestion of incremental backups in the base backup, adherence to the policy may help balance the impact of backing up a source storage on system resources. Further, since the creation of an incremental backup does not require exclusive access to a base backup, as may be required during the creation of a decremental backup, adherence to the policy may allow increased access to prior backups.

In one example embodiment, a method for utilizing an incremental backup in a decremental backup system includes, first, creating a base backup that includes all original allocated blocks in a source storage at a first point in time. Next, an incremental backup is created that includes allocated blocks in the source storage that were newly allocated or were changed between the first point in time and a second point in time. Then, the changed allocated blocks in the incremental backup are identified. Next, during a third time period, a decremental backup is created and the incremental backup is ingested into the base backup by copying, into the decremental backup, original allocated blocks from the base backup that correspond to the changed allocated blocks in the incremental backup. Lastly, the newly-allocated blocks and the changed allocated blocks from the incremental backup are added to the base backup.

In another example embodiment, a method for utilizing an incremental backup in a decremental backup system includes, first, creating a base backup that includes all original allocated blocks in a source storage at a first point in time. Next, a policy is employed to determine that a second point in time is appropriate for creation of an incremental backup of the source storage instead of a decremental backup of the source storage. Then, the incremental backup is created to include allocated blocks in the source storage that were newly allocated or were changed between the first point in time and the second point in time. Next, the changed allocated blocks are identified in the incremental backup. Then, the policy is employed to determine that a third time period is appropriate for creation of the decremental backup and ingestion of the incremental backup into the base backup. Next, during the third time period, the decremental backup is created and the incremental backup is ingested into the base backup by copying, into the decremental backup, original allocated blocks from the base backup that correspond to the changed allocated blocks in the incremental backup. Lastly, the newly-allocated blocks from the incremental backup and the changed allocated blocks from the incremental backup are added to the base backup.

It is to be understood that both the foregoing general description and the following detailed description are exemplary and explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

The term "storage" as used herein refers to computer-readable media, or some logical portion thereof such as a volume, capable of storing data in blocks. The term "block" as used herein refers to a fixed-length discrete sequence of bits. In some example embodiments, the size of each block may be configured to match the standard sector size of a file system of a storage on which the block is stored. For example, the size of each block may be 512 bytes (4096 bits) where 512 bytes is the size of a standard sector. The term "allocated block" as used herein refers to a block in a storage that is currently tracked as storing data by a file system of the storage. The term "free block" as used herein refers to a block in a storage that is not currently employed nor tracked as storing data by a file system of the storage. The term "backup" when used herein as a noun refers to a copy or copies of one or more blocks from a storage. The term "base backup" as used herein refers to a base backup of a storage that includes at least a copy of each unique allocated block of the storage at a point in time such that the base backup can be restored on its own to recreate the state of the storage at the point in time, without being dependent on any other backup. A "base backup" may also include nonunique allocated blocks and free blocks of the storage at the point in time. The term "incremental backup" as used herein refers to an at least partial backup of a storage that includes at least a copy of each unique allocated block of the storage that was modified between a previous point in time of a previous backup of the storage and the subsequent point in time of the incremental backup, such that the incremental backup, along with all previous backups of the storage, including an initial base backup of the storage, can be restored together to recreate the exact state of the storage at the subsequent point in time. An "incremental backup" may also include nonunique allocated blocks and free blocks of the storage that were modified between the previous point in time and the subsequent point in time. The term "modified block" as used herein refers to a block that was modified either because the block was previously allocated and changed or because the block was modified by being newly allocated. The term "decremental backup" as used herein refers to an at least partial backup of a storage that includes at least a copy of each unique allocated block from a base backup of the storage that corresponds to a block that was modified in the source storage between a previous point in time and a subsequent point in time, such that the decremental backup, along with all subsequent decremental backups of the storage, including a base backup of the storage, can be restored together to recreate the exact state of the storage at the previous point in time. A "decremental backup" may also include nonunique allocated blocks and free blocks from a base backup of the storage that correspond to blocks that were modified in the source storage between the point in time and the subsequent point in time. A "base backup," an "incremental backup," and/or a "decremental backup" may exclude certain undesired allocated blocks such as blocks of data belonging to files whose contents are not necessary for restoration purposes, such as virtual memory pagination files and machine hibernation state files.

Figure 1:
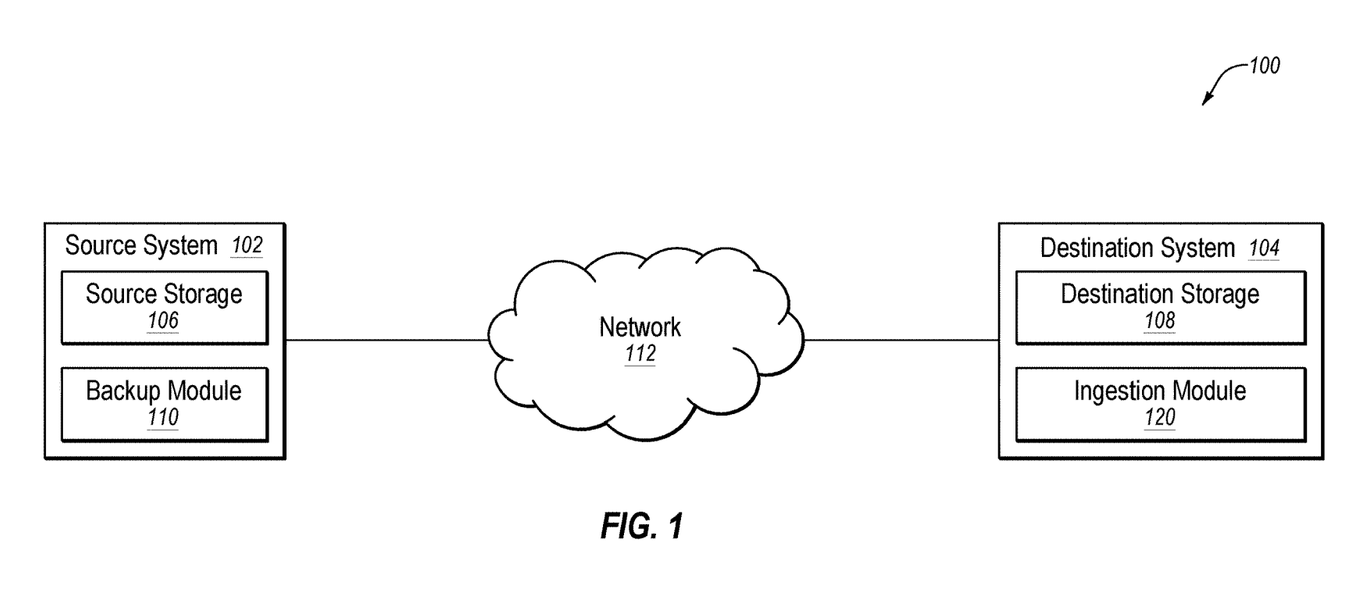
FIG. 1 is a schematic block diagram illustrating an example image backup system.

FIG. 1 is a schematic block diagram illustrating an example image backup system 100. As disclosed in FIG. 1, the example image backup system 100 includes a source system 102 and a destination system 104. The source system 102 includes a source storage 106 and the destination system 104 includes a destination storage 108. The source system 102 also includes a backup module 110. The destination system 104 further includes an ingestion module 120. The systems 102 and 104 are able to communicate with one another over a network 112.

The source system 102 and the destination system 104 may be any computing device capable of supporting a storage, including a virtual storage such as a virtual volume, and communicating with other systems including, for example, a file server, a web server, a personal computer, a desktop computer, a laptop computer, a handheld device, a multiprocessor system, a microprocessor-based or programmable consumer electronic device, a smartphone, a digital camera, a hard disk drive, a flash memory drive, a virtual machine, or some combination thereof. The network 112 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

In one example embodiment, the source system 102 may be a desktop computer, the destination system 104 may be a file server, and the network 112 may include the internet. In this example embodiment, the desktop computer may be configured to periodically back up its storage over the internet as part of a backup job by creating a base backup and multiple decremental and/or incremental backups and storing these backups in the storage of the file server. The desktop computer may also be configured to track modifications to its storage between backups in order to easily and quickly identify, during the creation of a decremental backup or an incremental backup, only those blocks that were modified. The file server may be further configured to periodically ingest incremental backups into the base backup, resulting in the creation of additional decremental backups. The file server may also be configured to restore one or more of the backups to the storage of the desktop computer over the internet if the desktop computer experiences corruption or a user simply desires to restore the storage of the desktop computer to an earlier point in time.

The image backups stored in the destination storage 108 may be created by the backup module 110. For example, the backup module 110 may be configured to execute computer instructions to perform image backup operations of creating a base backup and multiple decremental and incremental backups of the source storage 106. It is noted that these image backups may initially be created on the source system 102 and then copied to the destination system 104.

The ingestion module 120 may be configured to ingest incremental backups into a base backup. For example, after the backup module 110 has created a base backup of the source storage 106 and an incremental backup of the source storage 106, the ingestion module may ingest the incremental backup into the base backup, resulting in the creation of a decremental backup corresponding to the previous version of the base backup.

The backup module 110 and the ingestion module 120 may apply a policy that dictates the timing of creating incremental backups versus decremental backups and/or the timing of ingesting incremental backups into the base backup, resulting in the creation of additional decremental backups. For example, the policy may dictate that incremental backups be created during work hours, while resource utilization is relatively higher, and that decremental backups only be created after work hours, when resource utilization is relatively lower. Further, the policy may further dictate that the incremental backups be ingested into the base backup, resulting in the creation of additional decremental backups, after work hours when resource utilization is relatively lower. Since the creation of incremental backups is generally less resource intensive than the creation of decremental backups and than the ingestion of incremental backups in the base backup, adherence to the policy may help balance the impact of backing up a source storage on system resources. Further, since the creation of an incremental backup does not require exclusive access to a base backup, as may be required during the creation of a decremental backup, adherence to the policy may allow increased access to prior backups, such as increased access to a prior incremental backup that depends on a prior base backup, the prior base backup, or a prior decremental backup that depends on the prior base backup.

Although only a single storage is disclosed in each of the systems 102 and 104 in FIG. 1, it is understood that any of the systems 102 and 104 may instead include two or more storages. Further, although the systems 102 and 104 are disclosed in FIG. 1 as communicating over the network 112, it is understood that the systems 102 and 104 may instead communicate directly with each other. For example, in some embodiments the systems 102 and 104 may be combined into a single system. Also, although the storages 106 and 108 are disclosed as separate storages, it is understood that the storages 106 and 108 may be combined into a single storage. For example, in some embodiments a first volume of the source storage 106 may function as a source storage during the creation of a backup that is stored in a second volume of the source storage 106. Subsequently, the backup stored in the second volume may be restored to the first volume, which may enable the first volume of the source storage 106 to be restored to a state of an earlier point in time. In another example, the source system 102 may have a separate storage (not shown) to which a backup of the source storage 106 is restored. In both of these examples, the source system 102 functions as both a source system and a backup system. Further, although the backup module 110 and the ingestion module 120 are the only modules disclosed in the example image backup system 100 of FIG. 1, it is understood that the functionality of the backup module 110 and the ingestion module 120 may be replaced or augmented by one or more similar modules residing on either of the systems 102 and 104 or another system.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2A:
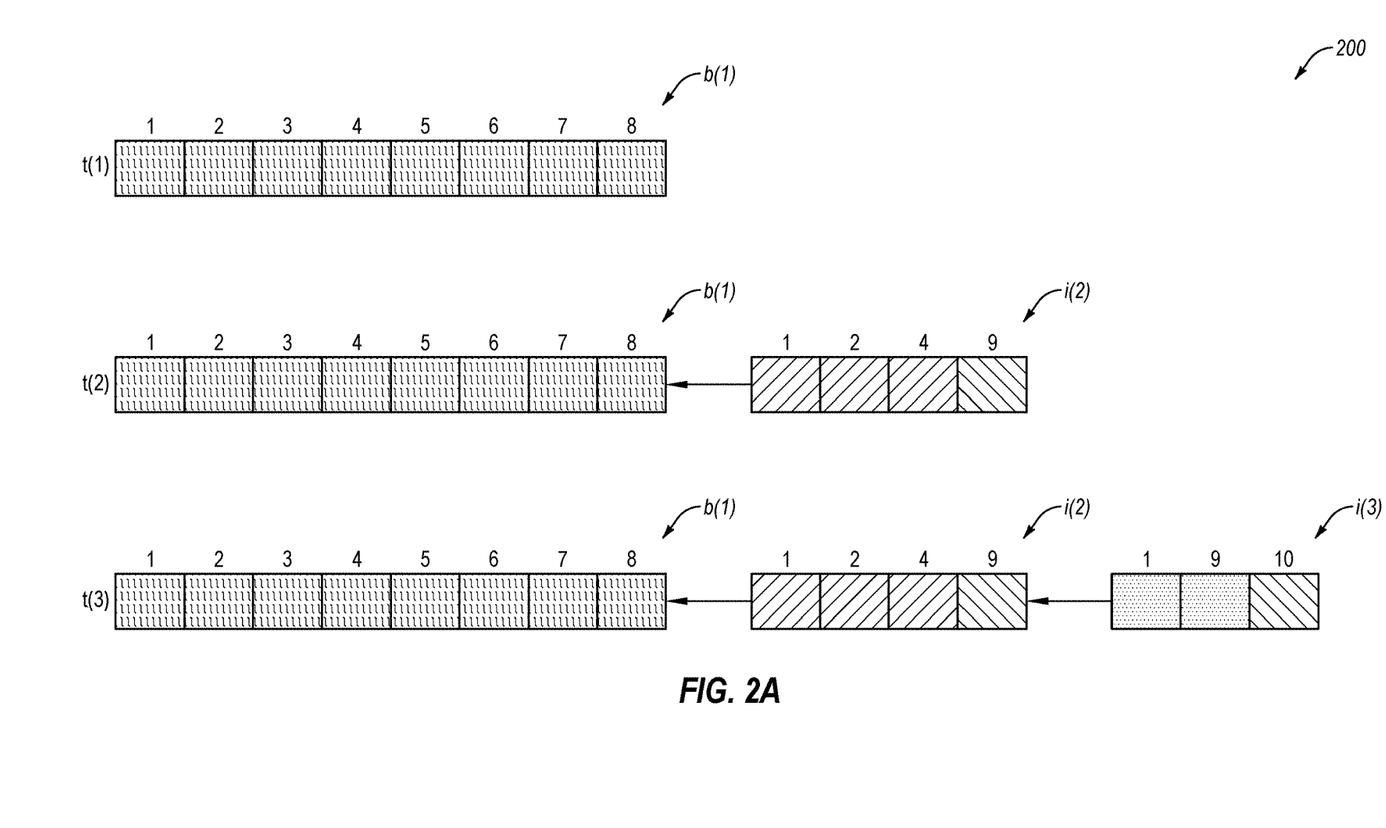
FIG. 2A is a schematic block diagram illustrating an example incremental backup chain.

FIG. 2A is a schematic block diagram illustrating an example incremental backup chain 200. The example incremental backup chain 200 includes a base backup b(1), an incremental backup i(2), and an incremental backup i(3), which represent the states of the source storage 106 at times t(1), t(2), and t(3), respectively. In one embodiment, the backup module 110 creates the base backup b(1), incremental backup i(2), and incremental backup i(3) of the source storage 106 and stores them in the destination storage 108. As disclosed in FIGS. 2A, 2B, and 4, blocks that are allocated are illustrated with a hatch pattern.

The base backup b(1) may be created to preserve the state of the source storage 106 at time t(1). This image backup operation may include the backup module 110 copying all allocated blocks in positions 1-8 of the source storage 106 as allocated at time t(1) and storing the allocated blocks in the destination storage 108. The state of the source storage 106 at time t(1) may be captured using snapshot technology in order to capture the data stored in the source storage 106 at time t(1) without interrupting other processes, thus avoiding downtime of the source storage 106. The base backup may be very large depending on the size of the source storage 106 and the number of allocated blocks at time t(1). As a result, the base backup may take a relatively long time to create and consume a relatively large amount of space in the destination storage 108.

Next, the incremental backups i(2) and i(3) may be created to preserve the states of the source storage 106 at times t(2) and t(3), respectively. The creation of the incremental backup i(2) may include copying only the blocks that were modified in the source storage 106 between time t(1) and time t(2), namely, the changed allocated blocks at positions 1, 2, and 4 in the source storage 106, and the newly-allocated block at position 9 in the source storage 106. Similarly, the creation of the incremental backup i(3) may include copying only the blocks that were modified in the source storage 106 between time t(2) and time t(3), namely, the changed allocated blocks at positions 1 and 9 in the source storage 106, and the newly-allocated block at position 10 in the source storage 106. Although blocks at positions 1 and 9 in the source storage were also modified between time t(1) and time t(2), the incremental backup i(3) only includes the blocks at positions 1 and 9 as modified between time t(2) and time t(3). The states of the source storage 106 at times t(1) and t(2) may also be captured using snapshot technology, thus avoiding downtime of the source storage 106. In general, as compared to the base backup b(1), each of the incremental backups i(2) and i(3) may take a relatively short period of time to create and consume a relatively small storage space in the destination storage 108.

Therefore, incremental backups may be created on an ongoing basis. The frequency of creating new incremental backups may be altered as desired in order to adjust the amount of data that will be lost should the source storage 106 experience corruption of its stored data or become unavailable at any given point in time. The data from the source storage 106 can be restored to the state at the point in time of a particular incremental backup by applying the image backups to a restore storage from oldest to newest, namely, first applying the base backup and then applying each successive incremental backup up to the particular incremental backup. For example, the data from the source storage 106 can be restored to the state at time t(2) by applying the base backup b(1) and then applying the incremental backup i(2). Similarly, the data from the source storage 106 can be restored to the state at time t(3) by applying the base backup b(1), then applying the incremental backup i(2), and finally applying the incremental backup i(3). Alternatively, the data from the source storage 106 can be restored to the state at the point in time of a particular incremental backup by applying the image backups to a restore storage concurrently, namely, concurrently applying the base backup and each successive incremental backup up to the particular incremental backup. For example, the data from the source storage 106 may be restored to the state at time t(3) by accessing the base backup b(1), the incremental backup i(2), and the incremental backup i(3) concurrently, and retrieving from each backup the correct block content corresponding to time t(3). The restore storage may be the source storage 106 or some other storage.

Figure 2B:
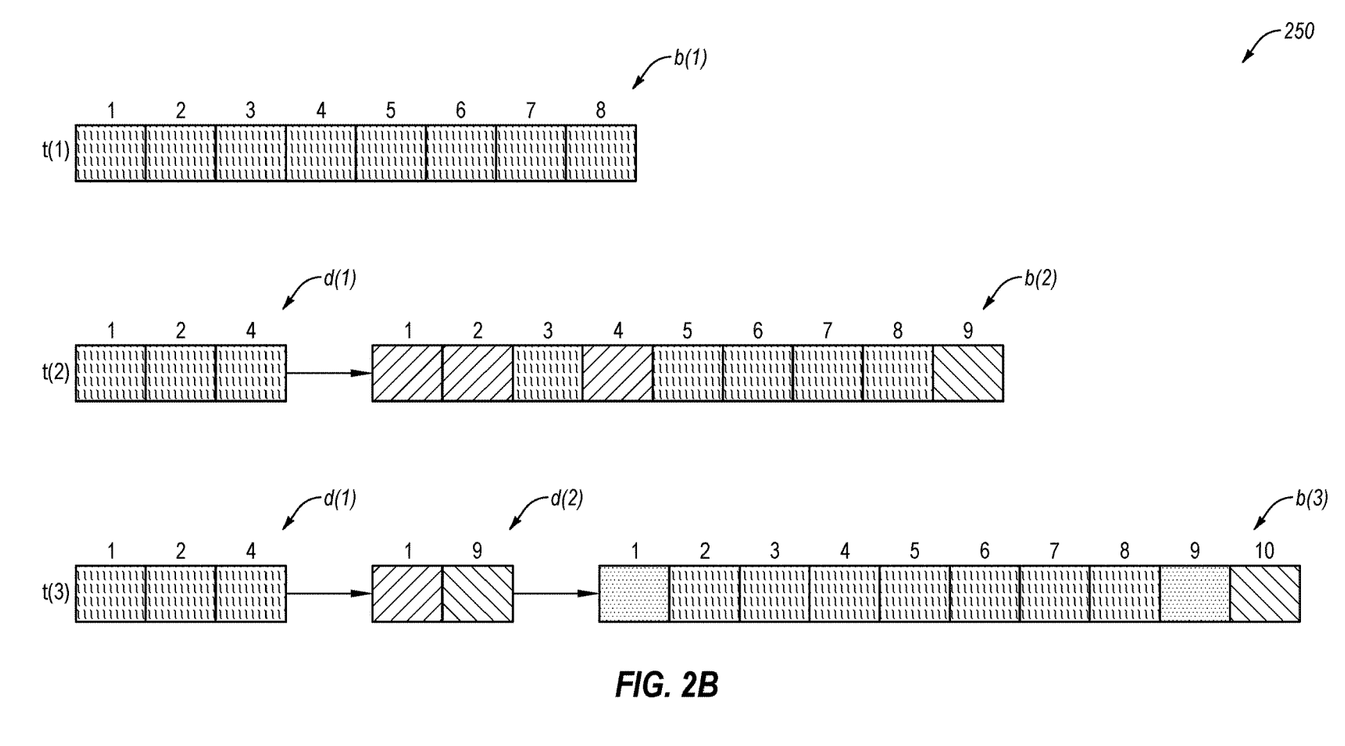
FIG. 2B is a schematic block diagram illustrating an example decremental backup chain.

FIG. 2B is a schematic block diagram illustrating an example decremental backup chain 250. The example decremental backup chain 250 includes base backups b(1), b(2), and b(3), which represent the states of the source storage 106 at times t(1), t(2), and t(3), respectively. In addition, the example decremental backup chain 250 includes decrementals d(1) and d(2), which represent the states of the source storage 106 at times t(1) and t(2), respectively. In one example embodiment, the backup module 110 creates the base backups b(1), b(2), and b(3) and the decremental backups d(1) and d(2) of the source storage 106 and stores them in the destination storage 108.

The base backup b(1) may be created to preserve the state of the source storage 106 at time t(1), and may generally be created in a similar manner as the creation of the base backup b(1) of FIG. 2A, although the format of the base backup b(1) in FIG. 2B may be different from the format of the base backup b(1) in FIG. 2A due to the base backup b(1) in FIG. 2B being formatted for use in the decremental backup chain 250 instead of the incremental backup chain 200. In particular, the base backup b(1) in FIG. 2B may have a randomly-writeable format in order to allow the base backup b(1) in FIG. 2B to have new blocks inserted into the base backup at various positions, while the base backup b(1) in FIG. 2A may have only a sequentially-writeable format since the base backup b(1) in FIG. 2B may not ever need to have new blocks inserted therein at various positions.

Next, the decremental backup d(1) may be created to preserve the state of the source storage 106 at time t(1) while the base backup b(1) is updated to capture the state of the source storage 106 at time t(2), resulting in the updated base backup b(2). This may be accomplished by the backup module 110 identifying allocated blocks in the source storage 106 that changed between time t(1) and time t(2), as well as newly-allocated blocks that were created in the source storage 106 between time t(1) and time t(2). In this example, the blocks at positions 1, 2, and 4 in the source storage 106 were changed, and the block at position 9 in the source storage 106 was newly allocated. The backup module 110 may then identify original blocks in the base backup b(1) with the same positions as the changed allocated blocks in the source storage 106, namely, the blocks at positions 1, 2, and 4 in the base backup b(1), and copy these original blocks at positions 1, 2, and 4 from the base backup b(1) into the decremental backup d(1). The changed allocated blocks and newly-allocated blocks from the source storage 106, namely, the changed allocated blocks from positions 1, 2, and 4 and newly-allocated block from position 9 of the source storage 106, are then added to the base backup b(1), resulting in the updated base backup b(2). As a result, the decremental backup d(1) represents the state of the source storage 106 at time t(1) and the updated base backup b(2) represents the state of the source storage 106 at time t(2).

Next, the decremental backup d(2) may be created to preserve the state of the source storage 106 at time t(2) while the updated base backup b(2) is again updated to capture the state of the source storage 106 at time t(3), resulting in the updated base backup b(3). This may be accomplished by the backup module 110 identifying allocated blocks in the source storage 106 that changed between time t(2) and time t(3), as well as newly-allocated blocks that were created in the source storage 106 between time t(2) and time t(3). In this example, the blocks at positions 1 and 9 in the source storage 106 were changed, and the block at position 10 in the source storage 106 was newly allocated. The backup module 110 may then identify original blocks in the base backup b(2) with the same positions as the changed allocated blocks in the source storage 106, namely, the blocks at positions 1 and 9, and copy these original blocks at positions 1 and 9 from the updated base backup b(2) into the decremental backup d(2). The changed allocated blocks and newly-allocated blocks from the source storage 106, namely, the changed allocated blocks from positions 1 and 9 and the newly-allocated block from position 10 of the source storage 106, are then added to the updated base backup b(2), resulting in the updated base backup b(3). As a result, the decremental backup d(1) represents the state of the source storage 106 at time t(1), the decremental backup d(2) represents the state of the source storage 106 at time t(2), and the updated base backup b(3) represents the state of the source storage 106 at time t(3).

Therefore, decremental backups may be created on an ongoing basis. The frequency of creating new decremental backups may be altered as desired in order to adjust the amount of data that will be lost should the source storage 106 experience corruption of its stored data or become unavailable at any given point in time. The data from the source storage 106 can be restored to the state at the point in time of a particular decremental backup by applying the image backups to a restore storage from newest to oldest, namely, first applying the base backup and then applying each successive decremental backup up to the particular decremental backup. For example, the data from the source storage 106 can be restored to the state at time t(1), after time t(2), by applying the base backup b(2) and then applying the decremental backup d(1). Similarly, the data from the source storage 106 can be restored to the state at time t(1), after time t(3), by applying the base backup b(3), then applying the decremental backup d(2), and finally applying the decremental backup d(1). Alternatively, the data from the source storage 106 can be restored to the state at the point in time of a particular decremental backup by applying the image backups to a restore storage concurrently, namely, concurrently applying the base backup and each successive decremental backup up to the particular decremental backup. For example, the data from the source storage 106 may be restored to the state at time t(1), after time t(3), by accessing the base backup b(3), the decremental backup d(2), and the decremental backup d(1) concurrently, and retrieving from each backup the correct block content corresponding to time t(1). Advantageously, the most recent backup state of the source storage 106 can be restored at any stage of the decremental backup chain 250 by simply applying the base backup of the decremental backup chain 250. The restore storage may be the source storage 106 or some other storage.

Although only allocated blocks are included in the example incremental backup chain 200 and in the example decremental backup chain 250 discussed above, it is understood that in alternative implementations both allocated and free blocks may be backed up during the creation of a base backup, an incremental backup, or a decremental backup. This is typically done for forensic purposes, because the contents of free blocks can be interesting where the free blocks contain data from a previous point in time when the blocks were in use and allocated. Therefore, the creation of base backups, incremental backups, and decremental backups as disclosed herein is not limited to allocated blocks but may also include free blocks.

In general, as compared to the base backup b(1), each of the decremental backups d(1) and d(2) may take a relatively short period of time to create and consume a relatively small storage space in the destination storage 108. However, as compared to the incremental backups i(2) and i(3), each of the decremental backups d(1) and d(2) may take a relatively longer period of time to create, due at least in part to the updating of the corresponding base backup that is associated with each of the decremental backups d(1) and d(2). In addition to taking longer to create, the creation of the decremental backups d(1) and d(2) may also be more resource intensive that the creation of the incremental backups i(2) and i(3). Further, the creation of the decremental backups d(1) and d(2) may require exclusive access to the corresponding base backup, while the creation of the incremental backups i(2) and i(3) may be accomplished without exclusive access to the base backup b(1). For these reasons, the example methods disclosed herein employ a hybrid backup system that creates incremental backups, during periods of higher resource utilization for example, and creates decremental backups, during periods of lower resource utilization for example, thereby helping balance the impact of backing up the source storage 106 on resources of the source system 102, and potentially allowing increased access to prior backups, as discussed in greater detail below.

Figure 3:
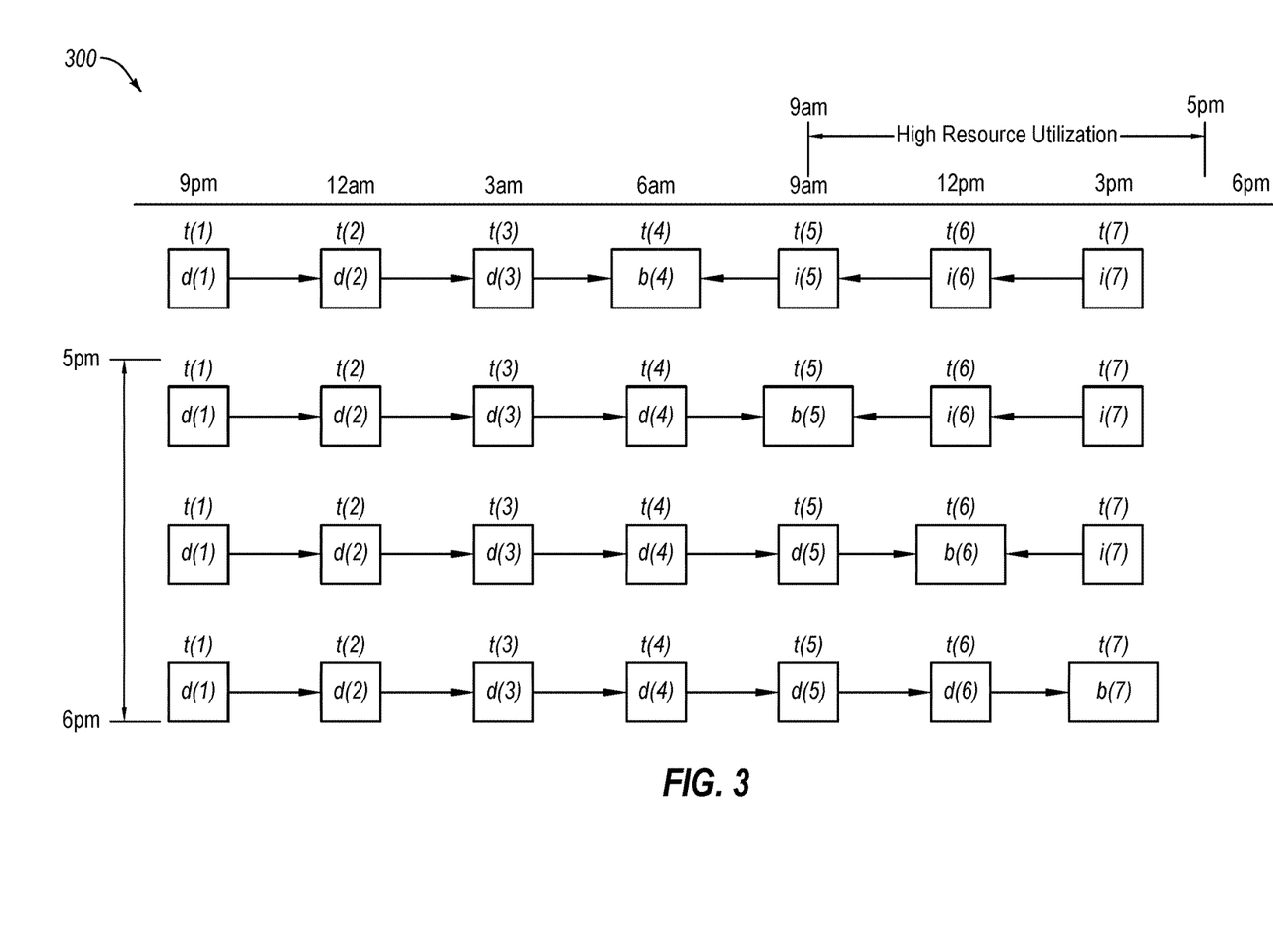
FIG. 3 is a schematic block diagram illustrating an example ingestion of multiple incremental backups into a base backup of a decremental backup chain according to a policy.

FIG. 3 is a schematic block diagram illustrating an example ingestion 300 of multiple incremental backups into a base backup of a decremental backup chain according to a policy. The example ingestion 300 occurs in a hybrid backup system in which a backup of the source storage 106 is created to represent the states of the source storage 106 every three hours. As discussed below, the hybrid backup system of FIG. 3 creates incremental backups during periods of higher resource utilization and creates decremental backups during periods of lower resource utilization, thereby helping to balance the impact of backing up the source storage 106 on the resources of the source system 102 and/or on the resources of the destination system 104 and potentially allowing increased access to prior backups.

As disclosed in FIG. 3, over a period of relatively lower resource utilization a decremental backup chain is created that includes decremental backups d(1), d(2), and d(3) and base backup b4, which represent the statuses of the source storage 106 at times t(1), t(2), t(3), and t(4), respectively. In one embodiment, the backup module 110 creates the decremental backups d(1), d(2), and d(3) and base backup b4 of the source storage 106 and stores them in the destination storage 108.

As disclosed in FIG. 3, the period of time between 9 am and 5 pm is a period of relatively higher resource utilization. This period of relatively higher resource utilization may be due to this time period corresponding to work hours for a user of the source system 102, for example. During the period of relatively higher resource utilization, the hybrid backup system of FIG. 3 is configured to create backups of the source system 102 at times t(5), t(6), and t(7) in a less resource-intensive manner than what is required when creating decremental backups. In particular, during the period of relatively higher resource utilization, the hybrid backup system of FIG. 3 is configured to create incremental backups i(5), i(6), and i(7), which represent the status of the source storage 106 at times t(5), t(6), and t(7), respectively. Since the creation of an incremental backup is less resource intensive than the creation of a decremental backup, the creation of the incremental backups i(5), i(6), and i(7) during the period of relatively higher resource utilization backs up the source storage 102 using fewer resources than would be required for the creation of corresponding decremental backups, which helps balance the impact of backing up the source storage 106 on the resources of the source system 102 and/or on the resources of the destination system 104. Further, since the creation of the incremental backups i(5), i(6), and i(7) does not require exclusive access to the base backup b(4), as may be required during the creation of each of the decremental backups d(1), d(2), and d(3), the creation of the incremental backup i(7), for example, during the period of relatively higher resource utilization may allow increased access to prior backups, such as increased access to the prior incremental backups i(5) and i(6) that depend on the prior base backup b(4), increased access to the prior base backup b(4) itself, or increased access to the prior decremental backups d(1), d(2), and d(3) that depend on the prior base backup b(4).

As disclosed in FIG. 3, the period of relatively higher resource utilization ends at 5 pm. Therefore, after 5 pm and prior to the scheduled time for the next backup of the source system 102 at 6 pm, the hybrid backup system of FIG. 3 is configured to ingest the incremental backups i(5), i(6), and i(7) into the base backup b4 of the decremental backup chain. As disclosed in FIG. 3, the ingestion of the incremental backup i(5) results in the creation of the decremental backup d(4) and an updated base backup b5. Similarly, the ingestion of the incremental backup i(6) results in the creation of the decremental backup d(5) and an updated base backup b6, and the ingestion of the incremental backup i(7) results in the creation of the decremental backup d(6) and an updated base backup b7. Even though this ingestion of incremental backups into the decremental backup chain is fairly resource-intensive, since the period between 5 pm and 6 pm is a period of relatively lower resource utilization, the source system 102 is better able to handle the relatively resource-intensive ingestion.

In some embodiments, a policy dictates whether a backup at any particular point in time is created as part of the decremental backup chain or is created as an incremental backup. For example, the policy may dictate the creating of an incremental backup based on the particular point in time occurring 1) during a predetermined time period in which a system load of the source system 102 is historically above a predetermined threshold (such as during work hours), 2) during a user-specified time period (such as during a time period when the user is placing a particularly heavy demand on the resources of the source system 102), or 3) during a predetermined event in a calendar of the user (such as during an event in the user's calendar that indicates that the user will be using the source system 102 for a presentation). Further, the policy may dictate the creating of a decremental backup based on the particular point in time occurring 1) during a predetermined time period in which a system load of the source system 102 is historically below a predetermined threshold (such as during non-work hours), 2) during a user-specified time period (such as during a time period when the user is not using the source system 102), or 3) during a predetermined event in a calendar of the user (such as during an event in the user's calendar that indicates that the user will be on vacation or flying across the country). The policy may further dictate whether a time period is an appropriate time period for ingestion of the incremental backups into the base backup of the decremental backup chain, based on similar criteria as the determination of as to whether a backup is created as part of the decremental backup chain or is created as an incremental backup.

Figure 4:
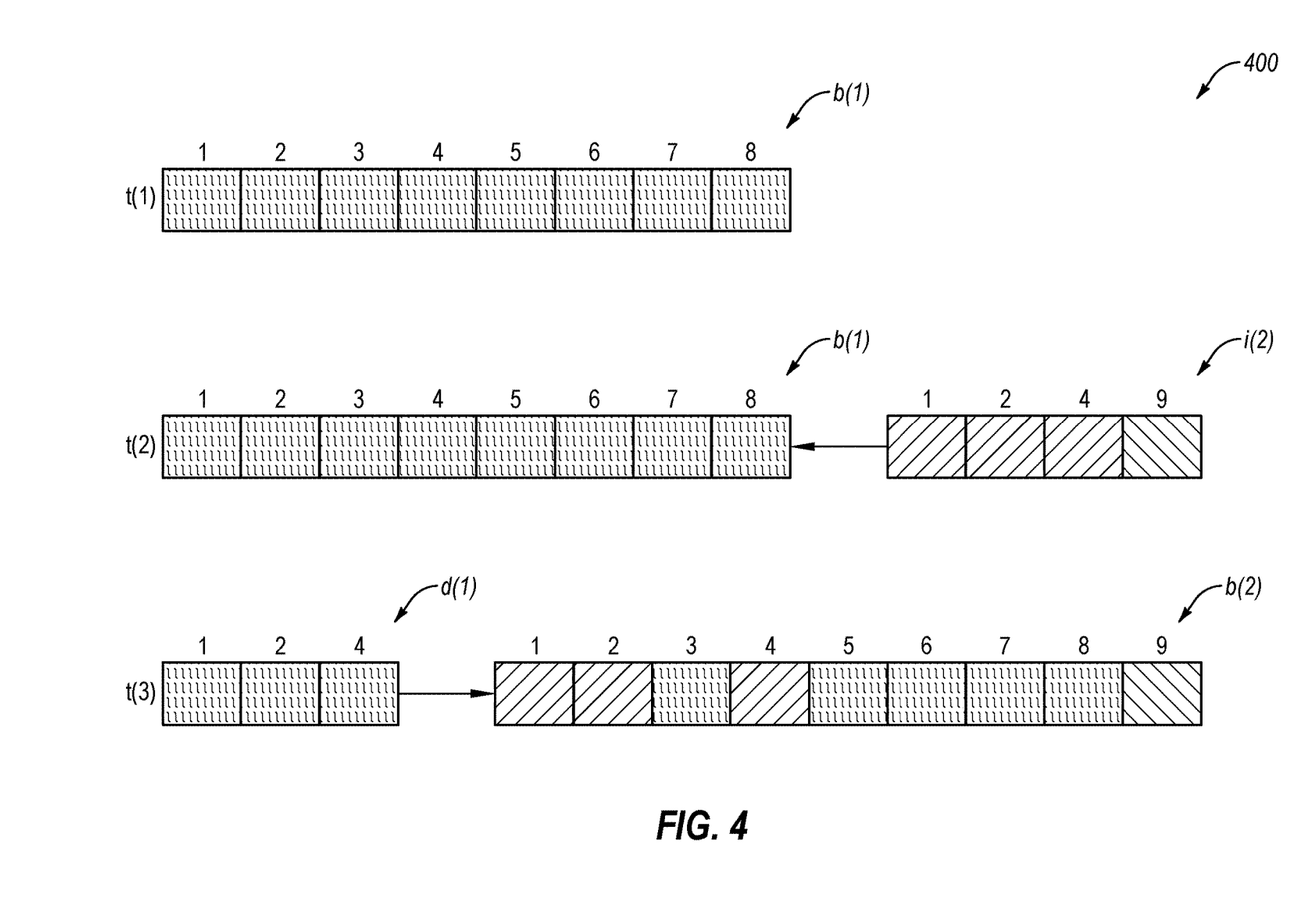
FIG. 4 is a schematic block diagram illustrating an example ingestion of an incremental backup into a base backup, resulting in the creation of a decremental backup and an updated base backup.

FIG. 4 is a schematic block diagram illustrating an example ingestion 400 of the incremental backup i(2) into the base backup b(1), resulting in the creation of the decremental backup d(1) and the updated base backup b(2). In one embodiment, the backup module 110 creates the base backup b(1) and the incremental backup i(2) of the source storage 106 and stores them in the destination storage 108, and then the ingestion module 120 ingests the incremental backup i(2) into the base backup b(1), resulting in the creation of the decremental backup d(1) and the updated base backup b(2).

The base backup b(1) and the incremental backup i(2) may be created to preserve the state of the source storage 106 at time t(1) and time t(2), respectively, and each may generally be created in a similar manner as the creation of the base backup b(1) and the incremental backup i(2) of FIG. 2A.

Later, the incremental backup i(2) may be ingested into the base backup b(1) in order to eliminate the incremental backup leaving only a decremental backup chain. This ingestion may be accomplished by the ingestion module 120 identifying the changed allocated blocks at positions 1, 2, and 4 in the incremental backup i(2). Then, the ingestion module 120 may create the decremental backup d(1) and update the base backup b(1) by copying, into the decremental backup d(1), the blocks at positions 1, 2, and 4 from the base backup b(1) that correspond to the changed allocated blocks at positions 1, 2, and 4 in the incremental backup i(2), and adding the newly-allocated block at position 9 from the incremental backup i(2) and the changed allocated blocks at positions 1, 2, and 4 from the incremental backup i(2) to the base backup b(1), resulting in the updated base backup b(2).

Figure 5:
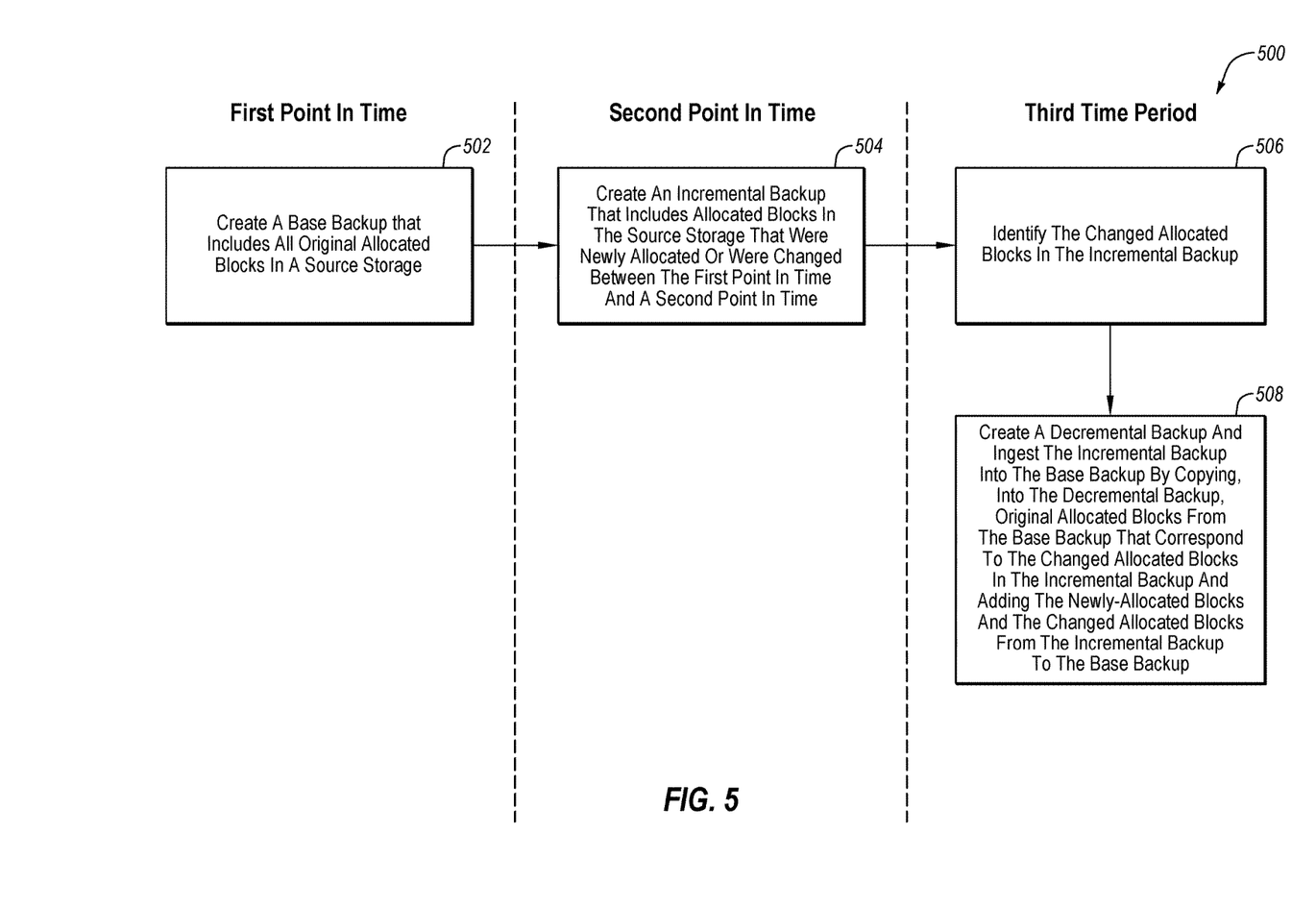
FIG. 5 is a schematic flowchart diagram of an example method for utilizing an incremental backup in a decremental backup system.

FIG. 5 is a schematic flowchart diagram of an example method 500 for utilizing an incremental backup in a decremental backup system. The method 500 may be implemented, in at least some embodiments, by the backup module 110 and the ingestion module 120 of the source system 102 of FIG. 1. For example, the backup module 110 and the ingestion module 120 may be configured to execute computer instructions to perform operations of utilizing an incremental backup in a decremental backup system, as represented by one or more of steps 502-508 of the method 500. The method 500 will now be discussed with reference to FIGS. 1, 4, and 5.

The method 500 may include step 502 in which a base backup is created that includes all original allocated blocks in a source storage at a first point in time. For example, the backup module 110 of FIG. 1 may create, at step 502, the base backup b(1) in FIG. 4 that includes all original allocated blocks at positions 1-8 in the source storage 106 at time t(1).

The method 500 may include step 504 in which an incremental backup is created that includes allocated blocks in the source storage that were newly allocated or were changed between the first point in time and a second point in time. For example, the backup module 110 of FIG. 1 may, at step 504, create the incremental backup i(2) in FIG. 4 that includes allocated blocks in the source storage 106 that were newly allocated, namely, the block at position 9 of the source storage 106, or were changed, namely, the blocks at positions 1, 2, and 4, between time t(1) and time t(2).

In at least some example embodiments, the creating of the incremental backup i(2) at time t(2), instead of creating the decremental backup d(1) at time t(2), is dictated by a policy. For example, the policy may dictate the creating of the incremental backup i(2) based on time t(2) occurring during a predetermined time period in which a system load of the source system 102 is historically above a predetermined threshold, such as during predetermined regular working hours of 9 am to 5 pm, as disclosed in FIG. 3, or while a system load is determined to be above a predetermined threshold, such as by contemporaneously measuring the system load to determine whether it is actually above a predetermined threshold. In another example, the policy may dictate the creating of the incremental backup i(2) based on time t(2) occurring during a user-specified time period or during a predetermined event in a calendar of the user.

The method 500 may include step 506 in which the changed allocated blocks in the incremental backup are identified. For example, the ingestion module 120 of FIG. 1 may, as step 506, identify the changed allocated blocks at positions 1, 2, and 4 in the incremental backup i(2).

For example, the ingestion module 120 may identify the changed allocated blocks in positions 1, 2, and 4 in the incremental backup i(2) by identifying, during the ingestion of the incremental backup i(2) into the base backup b(1), all blocks in the incremental backup i(2) (namely, the blocks at positions 1, 2, and 4 in the incremental backup i(2)) that correspond to original allocated blocks in the base backup b(1) (namely, the blocks at positions 1-8 in the base backup b(1)) as changed allocated blocks. The ingestion module 120 may then identify other blocks in the incremental backup i(2) (namely, the block at position 9 in the incremental backup i(2)) as newly-allocated blocks.

In another example, the ingestion module 120 may identify the changed allocated blocks in the incremental backup i(2) by comparing an FSBAM of the source storage 106 at time t(1), which may be backed up in file system metadata (FSM) in the block at position 1 of the base backup b(1) for example, to an FSBAM of the source storage 106 at time t(2), which may be backed up in FSM in the block at position 1 of the incremental backup i(2) for example, to identify the newly-allocated block in position 9 in the incremental backup i(2). The ingestion module 120 may then identify all blocks in the incremental backup i(2) that are not the newly-allocated blocks in the incremental backup i(2) as changed allocated blocks (namely, the blocks in positions 1, 2, and 4).

In another example, the ingestion module 120 may identify the changed allocated blocks by accessing a change tracking map that is employed to track all writes to blocks in the source storage 106 between time t(1) and time t(2). Where the change tracking map also tracks whether each write is executed on a previously-allocated block or on a newly-allocated block, accessing the change tracking map can allow the ingestion module 120 to quickly determine which blocks are changed blocks and which blocks are newly allocated. A change tracking map may be stored with each backup of the source system 106, or in another location, in order to maintain the information from the change tracking map.

The method 500 may include step 508 in which, during a third time period, a decremental backup may be created and the incremental backup may be ingested into the base backup by copying, into the decremental backup, original allocated blocks from the base backup that correspond to the changed allocated blocks in the incremental backup. In addition, the newly-allocated blocks from the incremental backup and the changed allocated blocks from the incremental backup may be added to the base backup. For example, during a third time period, the ingestion module 120 of FIG. 1 may, at step 508, create the decremental backup d(1) and ingest the incremental backup i(2) into the base backup b(1), resulting in the updated base backup b(2), as disclosed in FIG. 4.

In at least some example embodiments, the policy discussed above in connection with step 504, or another policy, may dictate that the third time period is an appropriate time period for ingestion of the incremental backup i(2) into the base backup b(1). For example, the policy may dictate that the third time period is an appropriate time period for creation of the decremental backup d(1) and for ingestion of the incremental backup i(2) into the base backup b(1) based on the third time period occurring during a predetermined time period in which a system load is historically below a predetermined threshold, such as during predetermined regular non-working hours between 5 pm and 6 pm as disclosed in FIG. 3, or while a system load is determined to be below a predetermined threshold, or outside any predetermined events in a calendar of a user.

The ingestion module 120 may ingest the incremental backup i(2) into the base backup b(1) by copying, into the decremental backup d(1), original allocated blocks from the base backup b(1) (namely, the blocks in the positions 1, 2, and 4 in the base backup b(1)) that correspond to the changed allocated blocks in the incremental backup i(2) (namely, the blocks in the positions 1, 2, and 4 in the incremental backup i(2)) and then adding the newly-allocated blocks from the incremental backup i(2) (namely, the block in the position 9 in the incremental backup i(2)) and the changed allocated blocks from the incremental backup i(2) (namely, the blocks in the positions 1, 2, and 4 in the incremental backup i(2)) to the base backup b(1), resulting in the updated base backup b(2). The copying of blocks into the decremental backup d(1) may occur prior to the adding of the newly-allocated and changed blocks into the base backup b(1). Alternatively, the newly-allocated blocks may be added to the base backup b(1), and then the copying of blocks into the decremental backup d(1) and the adding of the changed blocks to the base backup may be performed. The copying and adding of the changed blocks may be performed sequentially for each block, or some or all of the copying may be performed prior to some or all of the adding.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for utilizing an incremental backup in a decremental backup system, the method comprising:
   creating a base backup that includes all original allocated blocks in a source storage of a source system at a first point in time;
   determining whether a second point in time occurs when a system load on resources of the source system is above a threshold;
   in response to determining that the second point in time occurs when the system load on the resources of the source system is above the threshold, creating an incremental backup to include allocated blocks in the source storage that were newly allocated, and that were changed, between the first point in time and a second point in time,
   identifying the changed allocated blocks in the incremental backup; and
   determining whether a third time period occurs when the system load on the resources of the source system is above the threshold;
   in response to determining that the third time period occurs when the system load on the resources of the source system is not above the threshold, during the third time period, creating a decremental backup and ingesting the incremental backup into the base backup by:
      copying, into the decremental backup, original allocated blocks from the base backup that correspond to the changed allocated blocks in the incremental backup; and
      adding the newly-allocated blocks from the incremental backup, and the changed allocated blocks from the incremental backup, to the base backup.

2. The method of claim 1, wherein the identifying of the changed allocated blocks in the incremental backup includes identifying, during the ingestion of the incremental backup into the base backup, all blocks in the incremental backup corresponding to original allocated blocks in the base backup as changed allocated blocks.

3. The method of claim 1, wherein the identifying of the changed allocated blocks in the incremental backup includes:
   comparing a file system block allocation map of the source storage at the first point in time to a file system block allocation map of the source storage at the second point in time to identify the newly-allocated blocks in the incremental backup; and
   identifying all blocks in the incremental backup that are not the newly-allocated blocks in the incremental backup as changed allocated blocks.

4. The method of claim 1, wherein the creating of the decremental backup and the ingesting of the incremental backup into the base backup includes copying, into the decremental backup, all original allocated blocks from the base backup that correspond to the changed allocated blocks from the incremental backup prior to adding the newly-allocated blocks from the incremental backup, and the changed allocated blocks from the incremental backup, to the base backup.

5. The method of claim 1, wherein the creating of the decremental backup and the ingesting of the incremental backup into the base backup includes:
   adding the newly-allocated blocks from the incremental backup to the base backup; and
   for each changed allocated block in the incremental backup, sequentially performing the following:
      copying, into the decremental backup, the original allocated block from the base backup that corresponds to the changed allocated block; and
      adding the changed allocated block to the base backup.

6. One or more non-transitory computer-readable media storing one or more programs that are configured, when executed, to cause one or more processors to perform the method as recited in claim 1.

7. A method for utilizing an incremental backup in a decremental backup system, the method comprising:
   creating a base backup that includes all original allocated blocks in a source storage of a source system at a first point in time;
   employing a policy to determine, based on a system load on resources of the source system being above a threshold, that a second point in time is appropriate for creation of an incremental backup of the source storage instead of a decremental backup of the source storage;

in response to determining that the second point in time is appropriate for creation of an incremental backup, creating the incremental backup to include allocated blocks in the source storage that were newly allocated, and that were changed, between the first point in time and the second point in time;

identifying the changed allocated blocks in the incremental backup;

employing the policy to determine, based on the system load on the resources of the source system not being above the threshold, that a third time period is appropriate for creation of the decremental backup and ingestion of the incremental backup into the base backup; and in response to determining that the third time period is appropriate for creation of the decremental backup and ingestion of the incremental backup into the base backup, during the third time period, creating the decremental backup and ingesting the incremental backup into the base backup by:

copying, into the decremental backup, original allocated blocks from the base backup that correspond to the changed allocated blocks in the incremental backup; and adding the newly-allocated blocks from the incremental backup, and the changed allocated blocks from the incremental backup, to the base backup.

8. The method of claim 7, wherein the policy dictates the third time period as being appropriate for creation of the decremental backup and ingestion of the incremental backup into the base backup based on the third time period occurring during predetermined regular non-working hours.

9. The method of claim 7, wherein the policy dictates the third time period as being appropriate for creation of the decremental backup and ingestion of the incremental backup into the base backup based on the third time period occurring outside any predetermined events in a calendar of a user.

10. The method of claim 7, wherein the identifying of the changed allocated blocks in the incremental backup includes:

comparing a file system block allocation map of the source storage at the first point in time to a file system block allocation map of the source storage at the second point in time to identify the newly-allocated blocks in the incremental backup; and identifying all blocks in the incremental backup that are not the newly-allocated blocks in the incremental backup as changed allocated blocks.

11. The method of claim 7, wherein the creating of the decremental backup and the ingesting of the incremental backup into the base backup includes:

adding the newly-allocated blocks from the incremental backup to the base backup; and for each changed allocated block in the incremental backup, sequentially performing the following:

copying, into the decremental backup, the original allocated block from the base backup that corresponds to the changed allocated block; and adding the changed allocated block to the base backup.

12. One or more non-transitory computer-readable media storing one or more programs that are configured, when executed, to cause one or more processors to perform the method as recited in claim 7.

* * * * *